United States Patent Office 3,138,555
Patented June 23, 1964

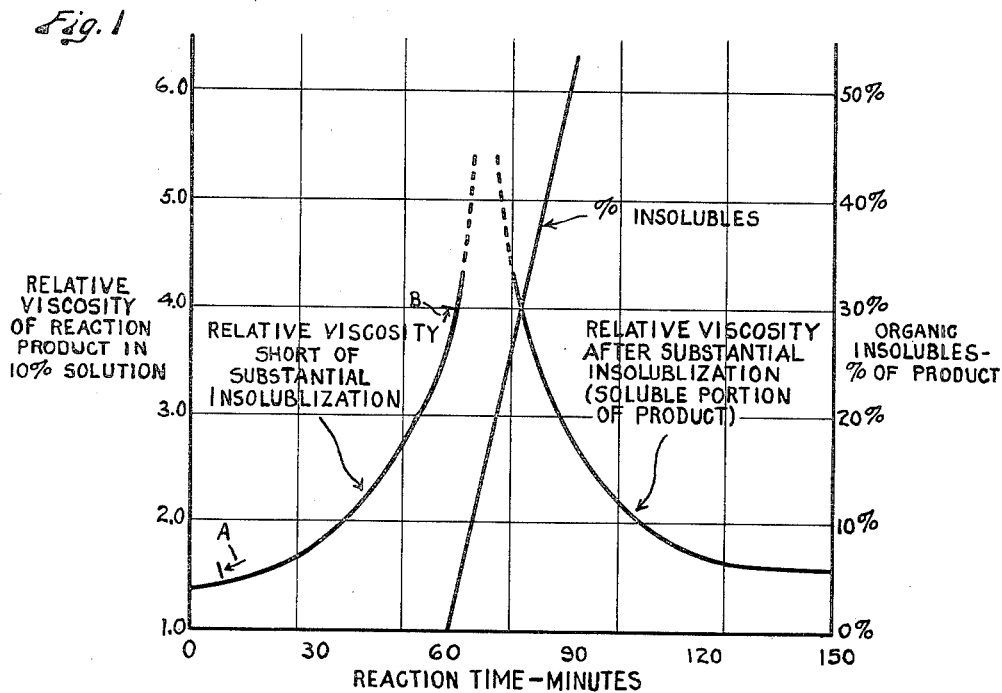

3,138,555
ACID POLYMERIZATION OF SPENT SULFITE
LIQUOR DERIVED SOLIDS, POLYMERIZED
REACTION PRODUCTS FORMED THEREBY,
AND COMPOSITIONS UTILIZING SAME
Ellis Gray King and Carl Adolphson, Bellingham, Wash.,
assignors to Georgia-Pacific Corporation, Portland,
Oreg., a corporation of Georgia
Filed Mar. 21, 1958, Ser. No. 723,036
9 Claims. (Cl. 252—8.5)

Our invention and discovery relates to the process of improving the valuable properties of sulfonated lignin containing materials such as obtained from a bisulfite pulping process, further relates to the products formed thereby and to compositions incorporating such products.

Such products, formed by the acid polymerization process of the present invention, are especially useful as dispersion agents employed as additives in oil well drilling mud compositions. Also, such products are useful as dispersing agents in ceramics, pigments, cements, plasters, rubber the like.

More particularly, our invention relates to acid polymerization (i.e. condensation) of the lignosulfonate components of spent sulfite liquor derived solids, under controlled conditions producing polymerization short of insolubilization, thereby increasing the effectiveness of such solids and particularly the lignosulfonate components thereof, as dispersants in clay-water suspensions, such as drilling muds.

This application is a continuation-in-part of our copending application Serial No. 433,794, filed June 1, 1954, now abandoned, entitled "Process of Improving the Effectiveness of the Components of Spent Sulfite Liquor and the Products Thereof," and our copending application Serial No. 539,542, filed October 10, 1955, now U.S. Patent No. 2,935,504, entitled "Process of Improving the Effectiveness of the Components of Spent Sulfite Liquor and the Products Thereof." According to one form of treatment of solids derived from calcium base spent sulfite liquor, as disclosed in said copending applications, such concentrated liquor solids are treated with an acid for one to two hours at 95° to 100° C.

The present invention and discovery generally involves acid polymerization of spent sulfite liquor derived solids under reaction conditions where the contained lignosulfonic acid is relatively concentrated and is essentially free of water soluble inorganic salts, the reaction being carried out at a pH of less than about 4 and at an elevated temperature for a time sufficient to increase the relative viscosity of a 10% solution of the reaction product to less than about 4.0 and to cause improvement in dispersive properties thereof when used as a dispersing agent in a drilling mud composition, as demonstrated by standard API lime base mud testing procedure.

When using a lignosulfonate as a dispersant in a colloidal solution or clay-water suspension, such as in drilling mud compositions of the so-called lime base or fresh water types, the presence of substantial amounts of soluble inorganic salts in the dispersant are considered contaminants, tending to cause coagulation and like adverse effects.

By virtue of the fact that the reaction of the present invention is carried out without introduction of any substantial amount of water soluble inorganic salt, and by virtue of the controlled polymerization of the lignosulfonic acid only to a point short of substantial insolubilization thereof, markedly significant improvements in the dispersive effectiveness of the reaction products are obtained by practice of the present invention.

According to the present invention and discovery, it has also been determined that the entire lignosulfonate content of spent sulfite liquor derived solids can be upgraded to give equal or even better properties than previously obtained by selecting only the molecular weight lignosulfonate fractions from such solids, in terms of dispersive effectiveness in clay-water suspension. It has been further determined that the reaction conditions accomplishing this result are correlated in a manner permitting rather wide variation as to concentration of the spent sulfite liquor derived solids, as to the acidity of the reaction, and as to the time of the reaction.

Generally stated, our invention and discovery concerns the acid polymerization of spent sulfite liquor derived solids and contemplates the controlled heating of a relatively concentrated water solution of spent sulfite liquor derived solids under acid conditions and in the absence of substantial water soluble inorganic salts until a controlled degree of polymerization of the contained lignin sulfonic acid occurs, giving a substantial increase in molecular weight of the lignin sulfonic acid, short of substantial insolubilization thereof, and resulting in a contaminant free reaction product of improved dispersive effectiveness. It has been further found that in most instances a readily determinable increase in relative viscosity of the polymerized reaction product serves to correlatively identify the improved dispersive properties achieved by and characterizing our invention. In short, controlled polymerization of sulfonated lignin containing material to a readily identifiable relative viscosity of the reaction end product short of substantial insolubilization in many instances consistently produces such improved properties. The reaction end product is also readily identifiable, either alternatively or conjunctively, directly in terms of certain improved properties, such as its gel strength and water loss reducing capabilities in a test lime base drilling mud.

Considered somewhat more quantitatively, the present invention and discovery contemplates the heating of spent sulfite liquor derived solids at concentrations from about 10% to about 70% total solids by weight in aqueous solution, under acid conditions ranging from about pH 4 to about pH 0.2 and at a temperature from about 50° C. to about 180° C. for a time ranging from about 15 minutes to several days, the conditions being selected so that a polymerization reaction occurs, the starting material and acidic reagent being selected to insure that no substantial amount of water soluble inorganic salt is present in the reaction or reaction product, and the time of reaction being controlled so as to produce polymerization of the contained lignin sulfonic acid only to a degree short of substantial insolubilization. A reaction product so formed is characterized by demonstrably superior properties as a dispersion agent in clay-water solutions and suspensions, such as commonly employed in oil well drilling mud, improved effectiveness being shown by lowering of the gel strength, water loss and/or yield values of drilling mud compositions incorporating same.

While a wide variation in solids concentration, pH, and time of reaction are possible within the scope of the present invention, consistent with the requirements that acid polymerization occurs only to a point short of substantial insolubilization, it will be readily understood from our disclosure of the present invention and discovery that the degree of concentration of the solids and the comparative temperature level of the reaction are both quite significant, and the acidity of the reaction is also quite important in achieving the remarkable improvements in dispersive power of the product.

Selection of the solids concentration range to fall between about 10% and about 70% has been based on the consideration that concentrations below about 10% do not show any significant improvement in dispersive properties, while liquor solids concentrations above 70% are so viscous as to not be handleable in a practical manner by use of existing commercial processing equipment. A further consideration limiting the practical upper limit insofar as solids concentration is concerned is the fact that the polymerization involved by virtue of the reaction tends to further increase the viscosity of the solution making it even more difficult to handle. But the operability of our process is not limited to any maximum solids concentration, given commercial equipment or techniques by which the solution can be handled. Further, with regard to the lower limit of solids concentration, it has been determined that the lower concentration demonstrates more or less of a tendency for the reaction solution to hydrolyze rather than polymerize, with the lower concentrations showing a relatively greater tendency with respect to hydrolyzation. This finding is reported by a recent literature disclosure indicating that treatment of spent sulfite liquor derived solids at lesser concentration (about 4% solids) with acid does not cause polymerization but rather hydrolyzation of the lignin sulfonic acid and lowering of the molecular weight (see, for example, Felicetta, Vincent F. and McCarthy, Joseph L., "Molecular Weight of Lignosulfonates as Influenced by Certain Acidic Conditions," Journal of the American Chemical Society, vol. 79, page 4499).

With respect to temperature of reaction, it has been determined that the higher the reaction temperature, the faster the reaction will proceed and the shorter will be the reaction time. With temperatures above about 100° C., the reaction must of course proceed under super-atmospheric conditions, with the higher pressure as well as the higher temperature tending to promote a faster reaction rate. While higher reaction temperatures are more efficient in terms of requisite reaction time, it has also been determined that reactions at the relatively higher temperatures are more difficult to control. Accordingly, the selection of an appropriate reaction temperature under any given set of operating circumstances will involve somewhat of a compromise between desired reaction rate and desired degree to which the reaction is to be precisely controlled, in terms of reproducibility of reaction end product properties.

With respect to degree of concentration of the spent sulfite liquor derived solids in the aqueous solution in which the reaction takes place, it has been further determined that the rate of the reaction is directly related to the concentration of the solids in the solution and that more superior improvements in properties result at relatively high solids concentrations. Also, the more concentrated reaction solutions permit relatively lower reaction temperatures. Thus, with 70% concentration of solids in the solution a reaction temperature even as low as 50° C. is operable to cause polymerization.

With respect to the acidity of the reaction solution, it has been determined that the lower the pH (the more acidic the reaction), the more rapid the reaction, and the lower permissible temperature, coupled with an attendant greater difficulty in terms of the precise control of the reaction.

Thus, summarizing some of the generalized considerations respecting appropriate reaction conditions, it can be stated that superiority of end product properties will dictate as high a solids concentration as can be conveniently handled, as high a reaction temperature as can be practicably controlled, and as low a pH as in economical and practicably controlled. Commercial practice of the invention then involves determination and selection of the most desirable reaction conditions within the approximate ranges set forth, and it will be readily understood that a relatively low concentration will normally be associated with a relatively high reaction temperature and/or reaction time, that a relatively low reaction temperature will normally require a relatively low pH, that a relatively short reaction time will require relatively severe reaction conditions in terms of high temperature and/or relatively low pH, and that optimum reaction time is to be compromised with optimum reaction control.

In a preferred form, the acid polymerization of spent sulfite liquor derived solids, according to the present invention and discovery, can be accomplished by heating at about 40% concentration of spent sulfite liquor derived solids in aqueous solution at about pH 0.8 (by addition of about 4% $H_2SO_4$), at a temperature of about 90° C. for a period of about 24 hours. Another preferred and very effective reaction under super-atmospheric conditions can be accomplished by reacting a 40% concentration of spent sulfite liquor derived solids in aqueous solution at about pH 1 (by addition of about 4% $H_2SO_4$), at a temperature of about 140° C. under autoclavic, continuous flow conditions for a period of about one hour.

In terms of the characteristics of our reaction end product, the desirable improvements in dispersive effectiveness by acid polymerization of spent sulfite liquor derived solids has been determined to most significantly occur when the relative viscosity of the reaction end product in 10% aqueous solution increases to about 1.4–4, short of substantial insolubilization. It has also been determined that a preferred intermediate range of relative viscosity reflecting remarkable dispersive properties of the reaction end product occurs when the relative viscosity of the reaction end product in 10% aqueous solution is raised only to about 1.4–3.0, without substantial insolubilization. Further, it has been determined that the ideal point at which to interrupt the polymerization reaction characterizing the present invention and discovery is when the relative viscosity of the end product in 10% aqueous solution reaches about 1.6–1.8.

It will be observed that in all situations, the reaction of the present invention and discovery is interrupted before polymerization of the lignin sulfonic acid has proceeded to substantial insolubilization.

This consideration has been determined to be critical, according to the present invention and discovery, because if the acid polymerization is permitted to go to completion or even to the point of substantial insolubilization of the reaction product, the resulting reaction product when used as a dispersing agent in clay-water suspensions has comparative ineffectiveness when used in customary quantities customary for such additives. In this respect, it is theorized that polymerization to the point of substantial insolubilization result in such large molecules that the requisite number of molecules to form an effective dispersive film are simply not present in a clay-water dispersion when a customary amount of dispersing agent is used. An alternate theory in this regard is that polymerization to the point of substantial insolubilization results in relative chemical and/or physical inactivity, insofar as formation of the requisite dispersive film. In any event, data demonstrating effectiveness of the present invention as to selection of a reaction product evidencing the above indicated range relative viscosity short of substantial insolubilization shows remarkable superiority in terms of dispersive effectiveness when the reaction product of the present invention and discovery is used in normal amounts as a dispersing agent in clay-water solutions, particularly drilling muds.

For purposes of the present invention, the terms "short of substantial insolubilization," "substantially entirely water soluble," and "water soluble sulfonated lignin" contemplate the presence of les sthan about 5% organic insolubles in the reaction product, tested in the manner hereinafter set forth.

Spent sulfite liquor is commercially derived from the treatment of wood in the form of chips in the production of cellulose pulp when said chips are digested with an aqueous solution of an acid bisulfite, such as calcium bisulfite or alkali or other alkaline earth or ammonium bisulfite liquor at elevated temperatures under relatively high pressure. Under these conditions, the lignin which forms the sheaths for binding together the cellulose fibers of the wood is dissolved so that the cellulose is freed as a residue pulp. The lignin is extracted and is converted into a lignosulfonate salt (also known as lignin sulfonate or sulfonated lignin) and is a most complex product. Sulfonated lignin containing spent sulfite liquor is a very dilute solution and is a by-product in the wash water from the cellulose in the pulping industries, and is readily available in large quantities for use as the initial raw material for practice of our invention.

Let it be emphasized that such production of sulfonated lignin containing spent sulfite liquor as a by-product in the cooking of wood to make pulp results in a liquor containing most complex compounds, the chemistry of which has not been fully determined even though extended studies have been made of the same over a period of many years. Exhaustive treatment of these complex compounds and known reactions thereof are found in "The Chemistry of Lignin," by F. E. Brauns (1952), published by Academic Press, Inc., New York, New York, and in the two volume treatise "Wood Chemistry" by L. E. Wise (Second Edition, 1952), published by Reinhold Publishing Corporation, New York, New York.

Spent sulfite liquor contains not only the lignin in the form of various lignosulfonates but also such carbohydrates as glucose, xylose, fructose, mannose, galactose, arabinose, sulfonated sugars; also calcium sulfite and calcium bisulfite, and also conidendrin, and other more or less volatile organic compounds. Due to the high temperatures and high pressures involved in cooking the wood chips to free the cellulose, but primarily due to the complex character of wood itself, the constituency of the spent sulfite liquor formed during the wood digesting and pulping operation is mainly highly complex chemical compounds. The relative proportions of these components vary with the wood species and with the cooking conditions.

As the intial raw material for our process any sulfonated lignin containing material may be used whether the material contains calcium, magnesium, sodium, ammonium or other water soluble salts of the lignosulfonate. However, because of the undesirability of having any appreciable amount of water soluble inorganic salts present in the reaction product all of these lignosulfonates except calcium lignosulfonate must be first treated to be as free as possible of water soluble inorganic salts at the time of acid polymerization treatment. Hence, any of the other lignosulfonate containing materials can be utilized by first passing such through an ion exchange resin in the hydrogen form to yield a lignosulfonate salt of about pH 0.5, for example, which can then be heated as such or blended with a calcium base spent sulfite liquor to give a pH less than about 4. A more economical method is to treat a calcium base spent sulfite liquor with an acid whose calcium salt is insoluble. By this reaction a reaction mixture is produced of any desired pH less than about pH 4 which contains substantially no soluble inorganic salt after the insoluble calcium salt is removed either by filtration or centrifuging. The slight amount of calcium sulfate, phosphate or oxalate which dissolves under these conditions is not sufficient to be deleterious to the product as a drilling mud thinner. Usually an amount of acid is added sufficient to precipitate the calcium present as calcium lignosulfonate. However, to obtain even lower pH, i.e. an even higher concentration of hydrogen ions for the polymerization reaction a slight amount of a stronger acid such as hydrochloric acid could be added provided the insoluble calcium salt has been removed so that no appreciable amount of soluble calcium salt would remain dissolved in the product.

Ammonium base spent sulfite liquor can be converted to calcium base spent sulfite liquor by heating the ammonium base liquor with an excess of a slurry of hydrated lime in water, using a grinding action to break up incrusted particles of lime and lignosulfonate. In this way, a calcium lignosulfonate is formed which can be used as a starting material in the manner previously described except that this product requires substantial amounts of acid to remove the excess lime. Sulfur dioxide and carbon dioxide could be used for this purpose to reduce the pH to about 5 or 6 after which some strong acid such as sulfuric acid can be used to displace the remainder of the calcium and give a reaction mixture having a pH less than 4. Another method of obtaining an acid reaction mixture is to add to the calcium base spent sulfite liquor an acid salt such as iron, chromium, copper or aluminum sulfate. By this procedure, the calcium sulfate is precipitated and separated from the liquor and an acid salt of the lignosulfonate is obtained which can be heated as such or further acidified with a strong acid such as sulfuric acid.

Thus, it can be seen that there are a number of methods of obtaining the spent sulfite liquor solids in an acid condition of pH less than 4 and suitable for polymerization treatment but that the main requirement is to obtain the reaction mixure in this condition without having it and the resulting reaction product contaminated by excessive water soluble inorganic salts.

Subject to the foregoing considerations, the sulfonated lignin containing material which is employed as the initial raw material in practice of our invention and discovery can be any of the following:

(1) Spent sulfite liquor as it is received from the blow pit of the pulp manufacturing plant. The term "spent sulfite liquor" (also known as "waste sulfite liquor") as used herein is used to denote this starting material. In the case of spent sulfite liquor, of course, the sulfonated lignin is in very dilute condition so that large volumes of liquor must be handled, and this spent sulfite liquor contains excessive and deleterious amounts of sulfur dioxide which requires additional basic reagent or equivalent for neutralization, rendering such unmodified, spent sulfite liquor not the preferred form of starting material.

(2) Spent sulfite liquor which has been modified by fermentation pretreatment according to a fermentation process such as that disclosed in Joseph L. McCarthy Patent No. 2,430,355, issued November 4, 1947, and entitled "Production of Useful Products by Microorganisms Active Upon Prepared Sulfite Liquor." It will be understood that such fermentation process normally includes prior "stripping" and removes, for the most part, the fermentable carbohydrates (predominantly sugars) from the spent sulfite liquor.

(3) Spent sulfite liquor modified by concentration pretreatment to any practical degree, such as from about 10% to about 70% by weight. For purposes of the present invention, it is to be noted that the technique known as "stripping" (passing steam through the solution) has the same function to a limited degree as concentration by evaporation because it serves to remove aldehydes, some volatile organic compounds, and loosely bound $SO_2$. As is also known, concentration pretreatment can be by either vacuum or high temperature evaporation.

(4) Spent sulfite liquor modified by both fermentation and concentration pretreatment, i.e. subjected to pretreatment according to both paragraphs 2 and 3 above.

Also, in considering the nature of possible starting materials for practice of our process and discovery, it is well known that removal of carbohydrates from the spent sulfite liquor can be accomplished by dialysis pretreatment while maintaining the liquid in solution form. However, this method of carbohydrates removal loses part of the sulfonated lignin and results in a very dilute solution thereof after pretreatment which is undesirable from a commercial point of view.

From the foregoing categorizations of various suitable initial raw materials for purpose of practice of the process of our invention and discovery, it will be seen that all such materials are sulfonated lignin containing materials obtained from a bisulfite pulping process, irrespective of whether or not the spent sulfite liquor is subject to modification pretreatment such as fermentation and/or concentration, and irrespective of whether they are of a type (sodium, magnesium or ammonium base) which must be modified prior to polymerization to prevent formation of undesirable water soluble inorganic salts. Accordingly, this term is used herein to generically denote such and equivalent initial raw materials. It will also be understood that the starting materials contemplated by the present invention are also categorizable as "spent sulfite liquor derived solids" or simply "liquor solids," in that the sulfonated lignin and other solute components of sulfite pulping effluent are popularly so identified. In considering the nature of possible initial starting materials, it is also well to observe that extracted lignin is commercially available in other than sulfonated form, such as in the form produced by the Kraft process of pulp manufacture. Treating the lignins extracted by the Kraft process with the same pulping chemical (i.e. an acid bisulfite) at elevated temperature and pressure results in obtainment of a sulfonated lignin from which lignosulfonic acid useful as the starting material in our process can be formed by ion-exchange pre-treatment in an ion-exchange column.

An acidic reagent suitable for practice of the present invention is generally identifiable as an acid, the calcium salt of which is water insoluble.

The acidic reagent preferred for the acid polymerization contemplated by the present invention and discovery is sulfuric acid, preferably of 4–20% concentration. It will be evident, however, that other acids, such as phosphoric acid and oxalic acid are also suitable since their calcium salts are water insoluble and since they have the capability of establishing the requisite hydrogen ion concentration. Sulfuric acid is preferred, however, because of the relatively low cost and the insolubility and ease of removal of the formed calcium sulfate. For purpose of use as a drilling mud additive, the calcium chloride content resulting from use of hydrochloric acid as the acid reagent masks any improvement which results from polymerization and hydrochloric acid is therefore not suitable.

The presence of inorganic water soluble salts is recognized to be highly deleterious to water-clay drilling muds. The addition of small amounts of sodium chloride, for instance, result in large increases in the viscosity and thixotropic properties of the mud. Up to about 1% of sodium chloride, the water loss is not greatly affected and can often be tolerated but above 1% of salt, the clay is flocculated and prohibitive increases in water loss occur. Concentrations of salt above 1% have erratic but objectionable effects on the viscosity characteristics of the mud. Other water soluble inorganic salts such as calcium chloride, sodium sulfate, sodium nitrate, magnesium sulfate, ammonium chloride and ammonium sulfate have similar flocculating and undesirable effects on the mud characteristics. Thus, it is highly desirable that any additive such as the drilling mud thinner which is to be added to the mud should contain as little as possible of these contaminants. This type of result is particularly seen in the low lime calcium chloride muds which are characterized by high gels and high water loss. The ammonium salts are even more undesirable in drilling mud formulations because in addition to the above effects, they have the following undesirable results: (1) because most drilling muds are alkaline the ammonia is displaced from the ammonium salts and gives a strong irritating and objectionable odor to the formulated mud, especially when it becomes hot; (2) ammonium salts promote the growth of bacteria, fungi and microorganisms in general and, hence, accelerate the deterioration of organic water loss retarding substances such as starch, necessitating the addition of preservative to prevent fermentation reactions even when starch is not present; and (3) the ammonium salts accelerate the corrosion of metallic equipment throughout the drilling rig.

Another undesirable feature of a water soluble inorganic salt such as calcium chloride is that in the presence of the organic thinner it prevents the thinning of the mud. For example, when calcium chloride alone is added to a clay-water mud, the mud increases in thickness until 1–2% of calcium chloride is added, after which the clay agglomerates and becomes thinner. However, if there is an organic thinner present no such thinning occurs and the mud stays extremely thick in character. Thus, it is undesirable to have any appreciable amount of a soluble inorganic salt as calcium chloride present in the organic thinner at the time it is added to the drilling mud.

The acid polymerized reaction product resulting from treatment according to the process of the present invention and discovery can optionally be subjected to such other and further treatment as may be desired, such as by an oxidation and/or base exchange reaction to form an iron, aluminum, chromium or copper lignosulfonate, such as by any of the methods of treatment set forth in our said copending applications Serial Nos. 433,794 and 539,542, as desired, to further improve the dispersion properties of the product.

In a commercial process where acid polymerization is coupled with a base exchange reaction to form ferrous lignosulfonate, for example, the acidic condition and reaction characterizing the present invention and discovery can be accomplished by utilization of a reaction involving addition of both sulfuric acid, for example, and ferric sulfate, for example, so that the acid polymerization reaction and the base exchange reaction proceed simultaneously, i.e. in one stage or operation.

Our invention and discovery shows that acid treatment to cause polymerization short of substantial insolubilization of the lignosulfonate components of spent sulfite liquor without formation of water soluble inorganic salts brings about an unexpected and remarkable change in the charatceristics of the sulfonated lignin containing material markedly enhancing its effectiveness as an additive for drilling muds. By our process, useful products are produced which have not been heretofore obtained from spent sulfite liquor either unchanged or in its fermented and/or concentrated forms, except by use of other and different treatments which require complicated and expensive reactions and equipment as compared with those required by our process.

To illustrate practice of the present invention and discovery by way of various examples, not limitive in character consistent with the general considerations earlier set forth, the following more detailed examples are presented.

To briefly outline the preparation procedure used in the following examples, the calculated proportion of acidic reagent (sulfuric acid) and water was added to concentrated and fermented spent sulfite liquor derived solids, to give the desired reaction constituency. Thus for example, in obtaining a solution of 40% total solids concentration of reaction solution and 12% sulfuric acid (a common combination) 80 grams of 50% liquor solids were diluted with dilute sulfuric acid containing 20 grams of water and 4.8 grams sulfuric acid. For uniformity, the sulfuric acid was not counted either as solids or as a diluent in the liquor solids solution.

For reactions proceeding at temperatures above 100° C., the acidulated solutions, such as obtained by the foregoing mixing procedure, were put into either stainless steel or glass lined bombs, as indicated, for heating. The inside dimensions of the bombs were about 2" diameter and 8" height, and the bombs were equipped with gasketed covers so that they would hold the contents even though high pressures developed on heating. After sealing, the bombs containing the solution were placed in a bath of hot oil or wax, and heated for the specified times. A thermometer in the well of the bomb indicated the temperature inside the bomb. The timing was started when the thermometer showed the temperature in the bomb had reached that of the bath. Each bomb was removed, cooled slowly in water, and opened. The contents when removed were neutralized with lime, centrifuged and dried. Drilling mud tests, relative viscosity tests, and tests for organic insolubles content were made utilizing the dried reaction products so formed.

Those samples which were heated at temperatures below 100° C. were heated in glass bottles placed in a hot water bath. This method was of course possible because the vapor pressure developed at temperatures below 100° C. was not high.

Generally speaking, in a commercial operation the reaction solution is heated in a pressure vessel, such as glass or ceramic lined steel pressure cooker and the treatment preferably is of the continuous type. Accordingly, in one of the following examples a continuous, autoclavic type reaction was undertaken to demonstrate the effectiveness of the reaction of the present invention and discovery under continuous conditions.

The procedure for viscosity testing of the acid polymerized spent sulfite liquor derived solids was as follows:

(1) Adjust a portion of the reaction product solution containing at least 5 grams of liquor solids to about pH 4, preferably with lime slurry.

(2) Centrifuge the solution to remove any insoluble matter.

(3) Dry on shallow trays at 95° to 100° C. (The product was found to generally contain about 7% moisture after 16 hours in the oven. The moisture content must be determined unless previous experience has shown it to be constant under particular conditions.)

(4) Pulverize the product using pestle and mortar.

(5) Weigh out the amount of pulverized product calculated to contain 5.00 grams (oven dried).

(6) Place the 5 grams of product in a glass-stoppered bottle together with sufficient water to make a solution containing 10% total solids, with about 20 grams of steel balls. Shake, using paint shaker or equivalent, until product is dissolved. With difficulty soluble samples hot water was used for preparation of the solution. With normal products about 5 minutes of shaking was sufficient but difficultly soluble products can require as much as 10 minutes of shaking.

(7) Centrifuge a portion of the solution in 35 cc. tubes for 10 minutes at 1500 r.p.m.

(8) Determine the flow time in an Ostwald capillary viscometer of the centrifuged solution at 25° C. Compare this value with that of distilled water at the same temperature and calculate the relaive viscosiy as follows:

$$\text{Relative Viscosity} = \frac{\text{Flow Time of the Sample Solution}}{\text{Flow Time of Distilled Water}}$$

The technique for determining organic insoluble content of the reaction product formed by the acid treatment conditions set forth in the following examples is as follows. The product, when cooled to room temperature, may be completely fluid, or it may be a soft, gelatinous solid. If it is a solid and is not well broken up, pieces remain which contain soluble solids; if it is broken up too finely, separation of the insoluble solids from the solution, either by filtration or centrifugation, becomes difficult.

The preferred procedure, if the product is solids, is to cut the solid into small pieces (not over ½ to 1" across), to put them in a beaker with enough warm water to reduce the solids concentration to 10–20%, add enough base, either sodium hydroxide or lime, to raise the pH to the range 3–4, and then grind the solids by pressing them against the bottom of the beaker, with a metal plate perforated with approximately ⅛" holes (potato masher), the plate being rotated at the same time. The solids are soon broken up and uniformly suspended.

Neutralization of the suspension to pH 4 is then completed, and the suspension is then centrifuged to remove the solids, and the solids may be washed by centrifuging, dried, and weighed. If there is a significant proportion of calcium sulfate in the precipitate, it is removed in order to obtain information on the weight of organic solids alone. A simple way of doing this is to wash the precipitate with a solution containing hydrochloric acid and ammonium chloride, which dissolves the calcium sulfate, then wash the residue with water, and dry and weigh as stated above.

If the product of the acid treatment is still fluid, little or no grinding may be necessary to obtain a uniform mixture which can be centrifuged to remove the solids.

Tests for dispersive properties of the reaction products set forth in the following examples were made in accordance with API Code 29 standard testing procedures, as set forth in our said copending application 539,542.

Utilizing these basic preparation and testing procedures, as appropriate and as indicated, the following examples illustrate typical examples and satisfactory ranges of reaction conditions for practice of the present invention:

EXAMPLE I

This example typically illustrates the acid treatment procedure for improving the drilling mud thinner properties of spent sulfite liquor.

639 grams of concentrated and fermented spent sulfite liquor containing 47% total solids were mixed with 223 grams of 16% sulfuric acid, placed in a stoppered bottle and heated at 95° C. in a water bath. Samples were removed after 24 hours and after 72 hours of heating, neutralized to pH 3 to 4 with lime, centrifuged to remove insolubles, and dried for testing as mud thinners.

The dried reaction products were tested at 2.0 and 6.0 lbs./bbl. in a laboratory limed mud to determine if an improvement was made. The mud tests, Table 1, show a large improvement in thinning properties as compared with the liquor solids.

Table 1 of Example I

THINNING OF LIMED MUD BY ACID POLYMERIZED SPENT SULFITE LIQUOR DERIVED SOLIDS

| Sample | #/bbl. | Rolled Overnight Room T. | | | | | Rolled 24 Hrs. 150° F. | | | | |
|---|---|---|---|---|---|---|---|---|---|---|---|
| | | I.G. | P.V. | Y. | 10 G. | W.L. | I.G. | P.V. | Y. | 10 G. | W.L. |
| Control (Untreated Liquor Solids). | 2.0 | (a) | (a) | (a) | (a) | (a) | (a) | (a) | (a) | (a) | (a) |
| | 6.0 | 1.0 | 7.0 | 4.0 | 32.0 | 15.3 | 1.0 | 6.0 | 3.5 | 13.0 | 16.8 |
| 24 Hrs. at 95° C | 2.0 | 9.0 | 4.0 | 7.0 | 32.0 | 21.4 | 10.0 | 4.0 | 7.0 | 45.0 | 21.6 |
| | 6.0 | 1.0 | 4.5 | 1.0 | 1.0 | 14.0 | 1.0 | 5.0 | 0 | 1.0 | 17.6 |
| 72 Hrs. at 95° C | 2.0 | 6.0 | 5.0 | 5.5 | 30.0 | 20.4 | 5.0 | 4.5 | 5.5 | 38.0 | 22.5 |
| | 6.0 | 1.0 | 5.0 | 1.0 | 1.0 | 7.8 | 1.0 | 4.5 | 1.0 | 2.0 | 13.3 | a Too thick to measure.

EXAMPLE II

To determine the practical limits of reaction conditions for the acid polymerization of spent sulfite liquor derived solids in the production of dispersion agents, several samples were investigated to show variations as to time, temperature, degree of acidity and total liquor solids concentration.

In the first series of samples, a total liquor solids concentration of 40% was selected, 20% $H_2SO_4$ was added (giving a pH of 0.23), and a reaction was carried out at a temperature of 70° C., the time of heating being varied from 0.17 day to 6 days.

Table 1 of Example II

RESULTS OF ACID TREATMENT CONDITIONS INVOLVING 20% $H_2SO_4$, 40% T.S., 70° C. (IN GLASS BOMBS)

| Sample No. | Heating Time (Days) | Relative Viscosity | Diffusion Coefficient (mm.²/day) | pH (After Treat.) | Drilling Mud Thinning Properties a | |
|---|---|---|---|---|---|---|
| | | | | | 10 Min. Gel (4 lb./bbl.) | Water Loss (6 lb./bbl.) |
| 1 | 0.17 | 1.55 | 12.5 | 0.6 | 42.0 | 15.4 |
| 2 | 1 | 1.64 | | 0.28 | 14.0 | 13.6 |
| 3 | 2 | 1.76 | | 0.28 | 25.0 | 13.6 |
| 4 | 4 | 2.22 | 5.6 | | 33.0 | 11.5 |
| 5 | 6 | 6.03 | | | 36.0 | 11.2 |
| Control* | | 1.37 | | | 33.0 | 16.8 | a Hot Rolled Values (24 hours at 150° F.).
*Fermented and dried spent sulfite liquor derived solids, without further treatment.

The second series of examples tested in this regard adopted a reaction solution involving 40% total liquor solids concentration, 12% sulfuric acid addition by way of total solids (pH 0.45), and variation in time of reaction from 0.5 hour to 4.0 hours.

Table 2 of Example II

RESULTS OF ACID TREATMENT CONDITIONS INVOLVING 12% $H_2SO_4$, PH 0.45, 40% T.S., 140° C. (IN STAINLESS STEEL BOMBS)

| Sample No. | Heating Time (Hours) | Relative Viscosity | Diffusion Coefficient (mm.²/day) | pH (After Treat.) | Drilling Mud Thinning Properties a,b | |
|---|---|---|---|---|---|---|
| | | | | | 10 Min. Gel (4 lb./bbl.) | Water Loss (6 lb./bbl.) |
| 1 | 0.5 | 1.72 | 6.7 | 1.2 | 3.0 | 11.2 |
| 2 | 1.0 | 2.08 | 6.4 | 1.6 | 1.5 | 9.4 |
| 3 | 1.0 | 2.70 | | 1.4 | 4.5 | 11.4 |
| 4 | 1.5 | 3.64 | | 1.6 | 12.5 | 11.2 |
| 4 | 2.0 | | | 1.6 | 1.5 | 11.3 |
| 6 | 2.5 | | | 1.7 | 4.5 | 11.2 |
| 7 | 3.0 | | | 2.3 | 3.5 | 12.0 |
| 8 | 4.0 | (c) | | | | |
| Control* | | 1.37 | | | 33.0 | 16.8 | a Hot rolled values (24 hours at 150° F.).
b Iron pickup from bombs possibly contributed to improvement in properties.
c Insoluble.
*Fermented and dried spent sulfite liquor derived solids, without further treatment.

EXAMPLE III

Further samples were tested in order to demonstrate the effect of further variations in total solids concentration, in temperature, in acid concentration, and in time of reaction on the gel strength and water loss reducing properties of the reaction product in a limed mud.

Results of these tests are presented in the following table:

Table 1 of Example III

| Sample No. | T.S., percent | Temp., °C. | $H_2SO_4$, percent of T.S. | Time At Temp., Hrs. | Insolubles, percent of Product | Relative Visc. | Diffusion Coefficient | Limed Mud Hot Rolled Data | |
|---|---|---|---|---|---|---|---|---|---|
| | | | | | | | | 10 Min. Gel., 4 lb./bbl. | W.L., 6 lb./bbl. |
| 1 | 10 | 140 | 12 | 2 | 0 | 1.36 | | 43.0 | 13.4 |
| 2 | 10 | 140 | 12 | 3 | 0 | 1.37 | 9.0 | 27.0 | 12.2 |
| 3 | 15 | 140 | 12 | 1.2 | 0 | 1.33 | | 32.0 | 13.0 |
| 4 | 15 | 140 | 12 | 1.8 | 0 | 1.36 | | 36.0 | 15.3 |
| 5 | 20 | 140 | 12 | 0.75 | 0 | 1.38 | | 25.0 | 13.0 |
| 6 | 20 | 140 | 12 | 1.10 | 0 | 1.41 | | 13.5 | 11.4 |
| 7 | 40 | 140 | 2.5 | 48 | 0 | 2.64 | | 12.0 | 11.4 |
| 8 | 40 | 140 | 2.5 | 72 | 0 | 1.70 | | 5.0 | 9.8 |
| 9 | 40 | 180 | 0.6 | 0.75 | 0 | 1.42 | | 31.0 | 12.6 |
| 10 | 60 | 65 | 12 | 6 | 0 | 1.63 | 7.4 | 30.0 | 13.6 |
| 11 | 60 | 65 | 12 | 21.3 | 0 | 2.25 | 6.4 | 15.0 | 12.0 |
| 12 | 60 | 65 | 12 | 29.5 | 0 | 1.60 | 7.9 | 5.0 | 9.4 |
| 13 | 60 | 65 | 12 | 53.5 | 8.5 | 7.06 | 11.0 | 60.0 | 10.4 |
| Control* | 40 | 140 | 2.5 | 0 | 0 | 1.37 | | 43.0 | 16.7 |

*Fermented and concentrated spent sulfite liquor solids, acidulated and heated, but without further treatment (i.e. reaction time=0).

From Table 1 of Example III it is seen that all of the reaction conditions there reported produce improvements in both gel strength and water loss properties when the reaction product is used as a dispersing agent, except in Sample No. 13, where the gel strength is not as good as achieved by the control material. With respect to said Sample 13, such reaction was carried out for an excessive time (53.5 hours), to the point where substantial insolublization (8.5%) resulted.

EXAMPLE IV

In order to more closely investigate the effect of reaction time on the dispersive properties of the reaction product in drilling mud, a further set of reactions were studied, giving the following results:

In the series of Samples 5–9, Sample 8 is also of particular interest. In this instance, no glass liner was used in the reaction bomb, and a substantial amount of iron pick-up resulted which remarkably reduced the gel strength of this reaction product to the very low value of 1.5. Since this Sample 8 is otherwise comparable to Sample 7 exhibiting an adversely high gel strength (96.0), the sharp effect and improvement on the properties of the reaction product resulting from the presence of iron (according to our aforementioned application Ser. No. 539,542) on acid polymerized spent sulfite liquor derived solids is striking.

In another series of samples (Samples 10–14), it is indicated by Sample 10 that a reaction time of 1 hour on this occasion gave satisfactory improvement of gel strength

*Table 1 of Example IV*

| Sample No. | T.S., percent | Temp., °C. | $H_2SO_4$, percent of T.S. | Time At Temp., Hrs. | Insolubles, percent of Product | Relative Visc. | Diffusion Coefficient | Limed Mud Hot Rolled Data | |
|---|---|---|---|---|---|---|---|---|---|
| | | | | | | | | 10 Min. Gel., 4 lb./bbl. | W.L., 6 lb./bbl. |
| 1 | 40 | 140 | 12 | 1.0 | 0 | 3.17 | 9.4 | 39.0 | 11.5 |
| 2 | 40 | 140 | 12 | 1.5 | 32 | 2.94 | 8.3 | 110.0 | 14.5 |
| 3 | 40 | 140 | 12 | 2.0 | 43 | 1.69 | 11.1 | 100.0 | 14.4 |
| 4 | 40 | 140 | 12 | 3.0 | 52.5 | 1.57 | 11.5 | 92.0 | 14.3 |
| 5 | 40 | 140 | 12 | 0.5 | 0 | 1.87 | | 8.5 | 9.6 |
| 6 | 40 | 140 | 12 | 0.75 | 0 | 2.77 | | 34.0 | 9.7 |
| 7 | 40 | 140 | 12 | 1.0 | 0.4 | 37.2 | | 96.0 | 10.4 |
| 8 a | 40 | 140 | 12 | a 1.0 | 0 | 1.74 | | 1.5 | 10.4 |
| 9 | 40 | 140 | 12 | 1.25 | 42.6 | 4.20 | | 74.0 | 12.2 |
| 10 | 40 | 140 | 12 | 1.0 | .03 | 2.91 | | 30.0 | 9.6 |
| 11 | 40 | 140 | 12 | 1.33 | 34.9 | 3.59 | | 55.0 | 11.3 |
| 12 | 40 | 140 | 12 | 1.5 | 52.8 | 1.88 | | 60.0 | 13.0 |
| 13 | 40 | 140 | 10 | 1.33 | 0.9 | 2.93 | | 36.0 | 9.7 |
| 14 | 40 | 140 | 14 | 1.33 | 56.4 | 1.34 | | 72.0 | 14.7 |
| Control* | 40 | 140 | 12 | 0 | 0 | 1.40 | | 50.0 | 15.7 | a No Glass Liner (contains iron).
*Fermented and concentrated spent sulfite liquor solids, acidulated and heated, but without further treatment (i.e. reaction time=0).

Thus, from Table 1 of Example IV, and studying a typical reaction involving 40% total solids, a reaction temperature of 140° C., and a sulfuric acid addition of 12% of the total solids (10% and 14% respectively in Samples 13 and 14), variations in the reaction time show the reaction to be fairly critical as a result of the relatively high temperature, relatively high solids concentration, and relatively acid reaction conditions.

Thus, comparing Samples 1–4 where the reaction time ranged from 1 to 3 hours, it is seen that beginning with a reaction time of 1.5 hours substantial insolubles were formed and adversely high 10 minute gel strengths were obtained.

In graduating the reaction time in smaller increments, as was done in Samples 5–9, it is again seen that the reaction time under the assigned conditions is rather critical and, in one instance, a quite high relative viscosity (37.2) was realized from the sample at a reaction time of 1 hour (Sample 7), with corresponding nonsuitability as a dispersing agent in limed mud demonstrated by an adversely high gel strength of 96.0. This pertains as to said Sample 7, notwithstanding the fact that the percent of the insolubles in this reaction product was only 0.4%, indicating that both relative viscosity and insolubles content are to be considered when the reaction is carried out at relatively high total solids concentration and when judging the reaction product properties to determine whether the resulting properties are such as to produce an effective dispersing agent.

and water loss properties (indicating a considerable degree of unpredictability in final properties around a reaction time of 1 hour under these conditions in that Sample 7 with a little higher insolubles was not satisfactory where Sample 10 with a little lower insolubles was satisfactory). Further, in said series of Samples 10–14, while a somewhat longer reaction time (Samples 11 and 12) resulted in considerable insolubilization and adverse increase in gel strength, reduction in the acid concentration somewhat (to 10% as in Sample 13), even with a reaction time of 1⅓ hours, still produced improvement in both water loss and gel strength properties. However, increasing the acid concentration somewhat (to 14% as in Sample 14), and again reacting the sample for 1⅓ hours, there resulted quite high insolubles and quite high gel strength.

FIG. 1 presents graphical plots in somewhat idealized form showing the manner in which relative viscosity and percent of organic insolubles respond during a typical acid polymerization reaction. The graphical presentations set forth in FIG. 1 are generalizations based on several reactions carried out at a concentration of 40% total solids, with 12% $H_2SO_4$, and at 140° C.

In FIG. 1, the plot of relative viscosity of the reaction production in 10% water solution shows that during the early stages of polymerization the relative viscosity increases until organic insolubles begin to form under the selected reaction condition, at a relative viscosity of about 3.6, the organic insolubles content reaching about 5% at a relative viscosity of about 4.0. As the reaction continues, the relative viscosity further increases and then decreases sharply and erratically (shown in FIG. 1 by broken lines), the insolubles content meanwhile further increasing in a linear manner. The erratic nature of the relative viscosity immediately upon formation of substantial insolubles and the continuing decrease thereafter of the relative viscosity is occasioned by the fact that the relative viscosity measured is only of the soluble portion of the reaction product and, as more and more of the lignosulfonic acid in the reaction product polymerizes to insolubility, less and less soluble portion is present in the test solution and the relative viscosity of the soluble portion decreases asymptotically as the reaction continues.

Thus, from FIG. 1 it will be observed that under the stated reaction conditions the reaction product characterizing the present invention is obtained by interrupting the reaction before the relative viscosity of the reaction product reaches about 4.0, i.e. in that portion of the relative viscosity plot lying between arrows A and B. It will be likewise apparent from the typical nature of a given reaction as presented in FIG. 1 that another selected set of reaction conditions and/or type of sulfonated lignin containing starting material has a corresponding characteristic graphical relationship, similar to FIG. 1, from which a relative viscosity general range AB or any particular point therealong is selectable by test as having particular efficacy as an additive in a given drilling mud or comparable composition.

EXAMPLE V

In order to further explore the practical limits of conditions for acid polymerization of spent sulfite liquor derived solids according to the present invention and discovery, further experiments were conducted giving a further indication of optimum conditions of acid reaction treatment, and giving additional indication of the practical ranges for time of reaction, reaction temperature, total solids concentration and degree of acidity of the reaction solution, within the scope of the present invention and discovery.

From the results of the experiments set forth in Table 1 of Example V, it will be seen that when the temperature is below that contemplated by the invention (i.e. 25° C. as in Samples 4, 5 and 6) there is no improvement in properties particularly as regards 10 minute gel strength values, within practical reaction times. Similarly, a reaction temperature of 50° C. although showing a degree of improvement in both gel strength and water loss properties is not preferred in view of the long reaction time necessary.

Similarly, Samples 7, 8 and 9 (Table 1, Example V) show that while addition of 2% sulfuric acid is satisfactory, such relatively high pH reaction also requires a relatively long reaction time in order to accomplish substantial improvement in reaction product dispersive properties.

EXAMPLE VI

In order to further investigate the nature of the reaction of the present invention and discovery at relatively low total solids concentration (i.e. 10% T.S.) a further group of samples were tested, all involving 10% total solids concentration, a reaction temperature of 140° C., and an acid content of 12%.

The results of these further tests are presented in the following table.

*Table 1 of Example VI*

| Sample No. | T.S., Percent | Temp., °C. | $H_2SO_4$, Percent of T.S. | Time At Temp. (Hrs.) | Insolubles, Percent of Product | Rel. Visc. | Diffusion Coefficient | Limed Mud Hot Rolled Data | |
|---|---|---|---|---|---|---|---|---|---|
| | | | | | | | | 10 Min. Gel. 4 lb./bbl. | W.L. 6 lb./bbl. |
| 1 | 10 | 140 | 12 | 5.0 | 0 | 1.37 | | 20.0 | 12.4 |
| 2 | 10 | 140 | 12 | 7.0 | 0 | 1.40 | | 13.0 | 12.4 |
| 3 | 10 | 140 | 12 | 8.5 | 0 | 1.46 | | 37.0 | 12.6 |
| 4 | 10 | 140 | 12 | 13 | 0 | 1.56 | | 48.0 | 12.2 |
| 5 | 10 | 140 | 12 | 19 | 0 | 1.57 | | 73.0 | 12.2 |
| Control* | 10 | | 12 | 0 | 0 | 1.37 | | 45.0 | 15.? |

*Fermented and concentrated spent sulfite liquor solids, acidulated and heated, but without further treatment (i.e. reaction time=0).

From the results presented in Table 1 of Example VI, it will be seen that the reaction is considerably less critical at a low total solids concentration, and that at a solids concentration of 10% the best improvement in gel strength and water loss properties occurred at a reaction time of 7 hours. It is evident that polymerization does occur even with a total solids concentration as low as about 10%, however, since the relative viscosities of the successive reaction products continue to increase. Further, with a low total solids concentration, there is a point reached when the dispersive properties of the reaction product are adversely increased (Samples

*Table 1 of Example V*

[Samples 1–6 heated in glass bombs, samples 7–12 heated in stainless steel bombs]

| Sample No. | $H_2SO_4$ Add.-Percent | T.S., Percent | Temp., °C. | Time | Rel. Visc. | 10 Min. Gel,a 4 lb./bbl. | W.L.,a 4 lb./bbl. | W.L.,a 6 lb./bbl. |
|---|---|---|---|---|---|---|---|---|
| 1 | 12 | 40 | 50 | 2 days | 1.49 | 18.0 | 15.4 | 14.8 |
| 2 | 12 | 40 | 50 | 4 days | 1.51 | 28.0 | 13.8 | |
| 3 | 12 | 40 | 50 | 6 days | 1.53 | 27.0 | 13.4 | |
| 4 | 12 | 40 | 25 | 7 days | 1.41 | 46.0 | 13.7 | 13.7 |
| 5 | 12 | 40 | 25 | 14 days | 1.43 | 47.5 | 13.8 | 13.7 |
| 6 | 12 | 40 | 25 | 22 days | 1.45 | 20.0 | 12.5 | |
| 7 | 2 | 40 | 140 | 2 hrs | 1.43 | 30.0 | 15.0 | |
| 8 | 2 | 40 | 140 | 8 hrs | 1.45 | 24.0 | 15.2 | |
| 9 | 2 | 40 | 140 | 16 hrs | 1.50 | 18.0 | 14.2 | |
| 10 | 12 | 20 | 140 | 1 hr | 1.47 | 11.0 | 14.4 | 13.9 |
| 11 | 12 | 20 | 140 | 4 hrs | 1.66 | 12.0 | 13.0 | 10.6 |
| 12 | 12 | 20 | 140 | 7 hrs | 2.02 | 24.0 | 13.4 | |
| Control* | | | | | 1.40 | 33.0 | 19.5 | 16.8 | a Drilling Mud Values are on Hot Rolled Limed Muds.
*Fermented and dried spent sulfite liquor solids, without further treatment.

4 and 5), even though no insolubles have been formed. Thus, from the data shown in Table 1 of Example VI it can be deduced that with a low total solids concentration of about 10%, the dispersive effectiveness of the reaction product must be investigated directly because the formation of substantial insolubles in a low concentration reaction is apparently not directly related to dispersive effectiveness in any manner comparable to the relationship which exists at relatively higher total solids concentration. Accordingly, it is to be observed that, when the reaction is employed at low total solids concentrations on the order of about 10%, the more practical technique for arriving at the most satisfactory reaction time is by direct test of improvement in dispersive properties in the clay-water suspension in which the reaction product is to be used as a dispersing agent since the relative viscosity under these conditions increases only relatively slightly (e.g. to 1.40 in Sample 2), and since significant insolubles content does not occur at least until the reaction proceeds well past optimum improvement in gel strength and water loss properties.

As above indicated, one manner of practice of the acid polymerization characterizing the present invention and discovery is in conjunction with a base exchange and/or oxidation treatment according to our copending application Ser. No. 539,542. To illustrate this manner of treatment, the following (Example VII) presents application of acid polymerization treatment procedure to prepare a dispersing agent with low water loss properties in contaminated oil well drilling muds, utilizing the procedure of the present invention and discovery, as well as the procedure of our said application Ser. No. 539,542.

EXAMPLE VII

To a concentrated solution of fermented spent sulfite liquor solids were added 10% by weight of ferric sulfate based on the liquor solids and 4% by weight of sulfuric acid dissolved in water to make a final composition having a total solids of 40% in the liquid phase. The mixture was passed through a heating vessel and stirred continually under about 110 pounds pressure at a temperature of 140° C. The mixture was fed to the vessel at the same rate as the withdrawal rate, giving a calculated average retention time of about 1 hour. The purpose of this manner of heating was to test the feasibility of the process for continuous production. The withdrawn product was cooled to 60°–80° C., diluted to 35% solids in the liquid phase and then oxidized according to the procedure of copending application Ser. No. 539,542 by adding 7% by weight of sodium dichromate based on soluble solids as a 25% solution with vigorous stirring, followed by heating the product mixture for 1 hour at 85°–100° C., centrifuged to remove insolubles, and dried.

The dried product was tested as a mud thinner (dispersing agent) in a gypsum contaminated laboratory mud prepared by adding the thinner and plaster of Paris simultaneously to a well aged suspension of commercial drilling clays in water. The test results were compared with drilling mud test results obtained using the product described in Example XIV of application Ser. No. 539,542 and with a combination of carboxymethyl cellulose (commonly used in drilling muds to control water loss) and the product of Example XIV.

The reaction product described in said Example XIV of our application Ser. No. 539,542, used for comparison purposes in relation to this example of the present invention, was prepared by digesting 100 grams calcium base fermented spent sulfite liquor solids for 8 hours at 90° C. in sufficient sodium hydroxide solution to obtain a reaction product with a pH of 8.0. This product was treated by adding a solution containing 20 grams of ferric sulfate, heating to 80° C., and centrifuging to remove the precipitated calcium sulfate. Then a solution containing 4 grams of sodium dichromate was added as an oxidizing agent, and a solution heated at 90° C. The water was removed by evaporation of the solids to dryness by heating on a steam bath.

To show the comparative test results in contaminated oil well drilling mud, Table 1 of this example, as set forth below, shows that the product of acid polymerization treatment gives better low water loss in so-called gyp mud than a product of said Example XIV of application Serial No. 539,542.

As indicated, one prior method of obtaining low water loss is adding carboxymethylcellulose. Table 1 below also shows that the low yield value and low gel strengths obtained with the present invention and discovery, as compared with the use of carboxymethylcellulose, are significantly better in that carboxymethylcellulose has a pronounced thickening effect on the mud.

*Table 1 of Example VII*

| Mud Treatment | Rolled 24 Hrs., 150° F. | | | | | |
|---|---|---|---|---|---|---|
| | pH | I.G. | P.V. | Y. | 10 G. | W.L. |
| 6 lb./bbl. Dried Reaction Product of This Example | 8.2 | 3.5 | 6.0 | 8.0 | 11.0 | 7.6 |
| 6 lb./bbl. of Product Example XIV Application 539,542 | 8.2 | 2.0 | 8.5 | 8.0 | 13.0 | 11.2 |
| 3 lb./bbl. of Product Example XIV Application 539,542 and 2 lb./bbl. carboxymethylcellulose | 8.2 | 4.0 | 17.0 | 9.0 | 42.0 | 8.7 |

EXAMPLE VIII

To show that an improved product may be obtained by a combination of acid treatment and an oxidation treatment (such as with 4% bichromate solution), such as described in Example V of our copending application Ser. No. 539,542, a sample of fermented spent sulfite liquor was first subjected to an acid treatment and then oxidized by adding 4% of sodium bichromate based on spent sulfite liquor solids. Samples taken after each step were neutralized to pH 4.0 with NaOH, dried at 60° C. and tested as thinners for limed muds.

A 50% solution of sulfuric acid containing 12% of sulfuric acid based on the spent sulfite liquor solids was mixed with a concentrated fermented spent sulfite liquor to obtain a solution containing 60% by weight of spent sulfite liquor solids. The mixture was heated at 65° C. for 6 hours and then diluted with water and neutralized to pH 4 with sodium hydroxide. The mixture was centrifuged to remove calcium sulfate and a portion dried for testing.

A 25% solution of sodium bichromate containing 4% of sodium bichromate based on the spent sulfite liquor solids was added to the remaining acid treated liquor. The mixture was heated 30 minutes at 90° C. and then dried for testing.

Drilling mud tests of this product, as reflected by Table 1 of Example VIII, show that the sodium bichromate treatment further lowered the yield and 10 minute gels of limed muds well below those obtained with the acid treatment.

Table 1 of Example VIII

| Sample No. | lb./bbl. | Rolled Overnight Room Temp. | | | | | Rolled 20 Hrs., 150° F. | | | | |
|---|---|---|---|---|---|---|---|---|---|---|---|
| | | I.G. | P.V. | Y. | 10 G. | W.L. | I.G. | P.V. | Y. | 10 G. | W.L. |
| Fermented SSL, No Treatment | 4.0 | 10.0 | 7.0 | 9.5 | 83.0 | 13.4 | 8.0 | 7.0 | 7.0 | 45.0 | 14.5 |
| | 6.0 | 2.0 | 6.0 | 5.5 | 42.0 | 13.4 | 1.0 | 7.0 | 3.0 | 17.0 | 15.6 |
| Acid Treatment: 12% H₂SO₄, 60% T.S. 65° C., 6 Hrs. | 4.0 | 3.0 | 9.5 | 8.0 | 51.0 | 13.2 | 2.0 | 7.5 | 6.0 | 30.0 | 12.9 |
| | 6.0 | 1.0 | 9.5 | 3.0 | 13.0 | 11.0 | 1.0 | 7.5 | 2.5 | 3.0 | 13.6 |
| 4% Bichromate Oxidation of Acid Treated SSL | 4.0 | 0.5 | 9.0 | 3.0 | 9.5 | 12.1 | 0.5 | 7.5 | 3.5 | 5.0 | 13.2 |
| | 6.0 | 0.5 | 9.0 | 1.5 | 1.0 | 10.1 | 0.5 | 7.5 | 1.5 | 0.5 | 13.3 |

EXAMPLE IX

To show that an improved product may be obtained by a combination of acid treatment and a partial base exchange with iron, chromium or aluminum salts similar to the base exchange (such as with 5% ferric sulfate solution), as described in Example VII, page 51 of our co-pending application Ser. No. 539,542, a sample of fermented spent sulfite liquor was first subjected to an acid treatment and then partially base exchanged with ferric sulfate. Samples taken after each step were neutralized to pH 4.0 with sodium hydroxide, dried at 60° C. and tested as thinners for limed muds.

12% of sulfuric acid by weight based on the spent sulfite liquor solids together with sufficient water to reduce the concentration of spent liquor solids to 40% were added to fermented spent sulfite liquor having a concentration of 48% by weight of non-volatile solids. The mixture was then heated at 140° C. in a sealed bomb for 0.75 hour. The product liquor was diluted and neutralized with sodium hydroxide to pH 4 and then centrifuged to remove calcium sulfate. The clarified liquor was dried for testing. A portion of the acid treated product was dissolved in water and 5% of ferric sulfate based on the dry solids was added as a water solution. The mixture was heated to 90° C., centrifuged to remove calcium sulfate and the clarified liquor dried for testing.

Drilling mud tests made with a laboratory limed mud, Table 1 of Example IX, show that the partial base exchange with ferric sulfate has lowered the mud yield and 10 minute gels well below those obtained with the acid treatment.

Table 1 of Example X

| Sample No. | Heating Time (Hrs.) | Rel. Visc.ᵃ | Limed Mud Hot Rolled Data | |
|---|---|---|---|---|
| | | | 10 Min. Gel (4 lb. bbl.) | API Water Loss (6 lb. bbl.) |
| 1 | 7 | 1.61 | 28.0 | 13.3 |
| 2 | 24 | 1.89 | 21.5 | 12.1 |
| 3 | 28 | 1.91 | 33.0 | 12.4 |
| 4 | 33 | 2.08 | 27.0 | 12.3 |
| 5 | 47 | 2.41 | 24.5 | 12.5 |
| Control* | 0 | 1.42 | 40.0 | 14.1 |

ᵃ No insoluble organic products were obtained in this experiment.
*Fermented and concentrated spent sulfite liquor solids from calcium base spent sulfite liquor, without further treatment.

EXAMPLE XI

To show that unfermented SSL may also be improved by digestion under controlled acidic conditions a sample of unfermented SSL was acid treated as follows:

SSL from the digester was evaporated to over 40% by weight of non-volatile solids on the steam bath and then mixed with 8.9% of sulfuric acid (based on liquor solids) and sufficient water to give 40% total solids. The mixture was placed in a glass stoppered bottle and digested in a hot water bath at 90° C. for 96 hours. Samples were removed for testing before starting to heat and at 24 hour intervals thereafter. The samples were neutralized to pH 4.0 with lime, centrifuged to remove calcium sulfate, and dried for testing.

The samples were tested as oil well drilling mud thinners using a laboratory limed mud made up from commercial drilling clays.

Table 1 of Example IX

| Sample No. | lb./bbl. | Rolled Overnight Room Temp. | | | | | Rolled 20 Hrs., 150° F. | | | | |
|---|---|---|---|---|---|---|---|---|---|---|---|
| | | I.G. | P.V. | Y. | 10 G. | W.L. | I.G. | P.V. | Y. | 10 G. | W.L. |
| Fermented SSL (No Treatment) | 4.0 | 10.0 | 7.0 | 9.5 | 83.0 | 13.4 | 8.0 | 7.0 | 7.0 | 45.0 | 14.5 |
| | 6.0 | 2.0 | 6.0 | 5.5 | 42.0 | 13.4 | 1.0 | 7.0 | 3.0 | 17.0 | 15.6 |
| 12% H₂SO₄, 40% T.S. 140° C., 0.75 Hr. | 4.0 | 3.5 | 10.5 | 15.0 | 93.0 | 11.6 | 1.0 | 8.5 | 7.0 | 34.0 | 11.6 |
| | 6.0 | 1.0 | 12.0 | 5.0 | 16.0 | 9.8 | 1.0 | 9.5 | 3.0 | 3.0 | 9.7 |
| 5% Ferric Sulfate Base Exchange of Acid Treatment SSL | 4.0 | 2.0 | 12.5 | 6.5 | 46.0 | 13.9 | 1.0 | 8.5 | 3.5 | 12.5 | 15.0 |
| | 6.0 | 1.5 | 5.5 | 20.0 | 47.0 | 10.6 | 1.0 | 12.0 | 3.5 | 5.5 | 11.6 |

EXAMPLE X

This example further demonstrates that the principles of the present invention are applicable to a highly concentrated (70% solids) reaction solution and that even a relatively low reaction temperature (50° C.) causes polymerization to proceed at a satisfactory rate.

In this example, the various samples tested were formulated by mixing fermented calcium base spent sulfite liquor derived solids containing 70% by weight with 15% by weight of sulfuric acid based on the non-volatile solids content. The mixtures were then heated in sealed glass jars at 50° C. Samples were removed at 7, 24, 28, 33 and 47 hours, then diluted and neutralized to pH 4 with dilute sodium hydroxide solution, then centrifuged to remove calcium sulfate and dried at 60° C. The dried samples were tested for relative viscosity of a 10% solution and as thinners for a limed mud, with the following results:

Table 1 of Example XI

PROPERTIES OF UNFERMENTED, CONCENTRATED SSL HEATED WITH 8.9% H₂SO₄ AT 40% TOTAL SOLIDS

| Sample No. | Heating Time (Hrs.) | Rel. Visc. | Drilling Mud Thinner Properties, hot rolled | |
|---|---|---|---|---|
| | | | 10 Min. Gel (4 lb./bbl.) | Water Loss (6 lb./bbl.) |
| 1 | 24 | 1.42 | 25.5 | 15.6 |
| 2 | 48 | 1.56 | 3.5 | 14.1 |
| 3 | 72 | 1.84 | 21.0 | 12.1 |
| 4 | 96 | 2.60 | 30.0 | 12.6 |
| Control | 0 | 1.36 | 42.0 | 17.4 |

EXAMPLE XII

To show that acid treatment with an acidic reagent which forms a water soluble inorganic salt with the calcium or other cation of the starting material is not significantly effective for purposes of the present invention, hydrochloric acid was substituted for sulfuric acid in a series of samples, as follows:

A batch of fermented and concentrated spent sulfite liquor containing 400 grams of non-volatile solids was mixed with dilute HCl containing 24 grams of hydrogen chloride to make a mixture containing approximately 40% of non-volatile solids by weight. A portion of the mixture was neutralized with sodium hydroxide to pH 4.5 and dried for a control and the remainder was placed in a glass bottle which was immersed at 90° C. Samples were removed from the bottle at intervals, neutralized to pH 4.5 with sodium hydroxide and dried for testing.

The viscosity of a 10% solution of each sample relative to water was measured in an Ostwald viscosity tube and the samples were tested as oil well drilling mud thinners using a laboratory limed mud made up from commercial drilling clays.

Table 1 of Example XII

PROPERTIES OF FERMENTED AND CONCENTRATED SSL HEATED WITH 6% OF HCl at 40% TOTAL SOLIDS, AND AT 90° C.

| Sample No. | Heating Time (Hrs.) | Relative Viscosity | Diffusion Coefficient, mm.²/day | Drilling Mud Thinner Properties | |
|---|---|---|---|---|---|
| | | | | 10 Min. Gel a (4 lb./bbl.) | Water Loss (6 lb./bbl.) |
| 1 | 24 | 1.56 | | 27.0 | 15.6 |
| 2 | 48 | 1.71 | 7.1 | 27.0 | 14.6 |
| 3 | 72 | 2.09 | | 49.0 | 13.6 |
| 4 | 96 | 4.75 | | 77.0 | 12.4 |
| Control* | 0 | 1.39 | 11.8 | 47.0 | 15.7 | a Values high because of coagulating effect of formed chlorides which are normally considered contaminants causing gelation in drilling muds.
*Concentrated and fermented SSL, acidulated with 6% HCl but without further treatment.

What is claimed is:

1. A drilling mud composition comprising a suspension of a clayey material in an aqueous medium containing an effective dispersing amount of an additive comprising an acid polymerized, water-soluble, sulfonated lignin-containing material having a relative viscosity in 10% aqueous solution of about 1.4–4.0, said additive having been prepared by a process comprising mixing a solution of sulfonated lignin-containing material with an acidic reagent, which reagent forms water-insoluble salts with calcium, to give a reaction solution having a pH of less than about 4.0, the concentration of sulfonated lignin-containing material in the reaction solution being between about 10% and about 70%, heating the acidulated mixture at a temperature of at least about 50° C. for a sufficient time to cause polymerization of the contained lignosulfonic acid to the point where the relative viscosity of an aqueous solution containing 10% by weight of the reaction product solids increases to about 1.4–4.0, and interrupting the reaction when such relative viscosity is reached.

2. A drilling mud composition according to claim 1, wherein said relative viscosity is about 1.6–1.8.

3. A drilling mud composition according to claim 1, wherein said composition is a lime-base drilling mud and wherein said relative viscosity is about 1.4–3.0.

4. A drilling mud composition according to claim 1, wherein said composition is a fresh water drilling mud.

5. A drilling mud composition according to claim 1, resulting from the polymerization of solids derived from calcium base spent sulfite liquor.

6. The drilling mud composition of claim 1, wherein the additive is polymerized in a reaction solution having a pH of less than about 1.0.

7. The drilling mud composition of claim 1, wherein the additive is polymerized at a reaction temperature in the range of about 90°–140° C.

8. A drilling mud composition according to claim 1, wherein said acidic reagent is sulfuric acid having a concentration of 4 to 20%.

9. A method of drilling a well comprising circulating in the well a well drilling fluid comprising the composition of claim 1.

References Cited in the file of this patent
UNITED STATES PATENTS

| | | |
|---|---|---|
| 1,840,157 | Cross et al. | Jan. 5, 1932 |
| 2,491,436 | Barnes | Dec. 13, 1949 |
| 2,491,437 | Perkins | Dec. 13, 1949 |
| 2,491,832 | Salvesen et al. | Dec. 20, 1949 |
| 2,774,754 | Schnell | Dec. 18, 1956 |
| 2,822,358 | Hearon et al. | Feb. 4, 1958 |
| 2,894,940 | Sperry | July 14, 1959 |
| 2,901,429 | Russell et al. | Aug. 25, 1959 |
| 2,935,504 | King et al. | May 3, 1960 |